(12) United States Patent
Brestovansky et al.

(10) Patent No.: US 10,081,081 B2
(45) Date of Patent: Sep. 25, 2018

(54) METHOD OF MANUFACTURING A WELDED TUBULAR SECTION USING IN-LINE NOTCHING AND TRIMMING INITIATED AFTER ROLL-FORMING AND WELDING

(71) Applicant: FLEX-N-GATE ADVANCED PRODUCT DEVELOPMENT LLC, Warren, MI (US)

(72) Inventors: Matthew Brestovansky, Leonard, MI (US); Dennis Stevenson, Angola, IN (US); Rob Fontichiaro, Saline, MI (US); Mark Niemiec, Highland, MI (US)

(73) Assignee: FLEX-N-GATE ADVANCED PRODUCT DEVELOPMENT LLC, Warren, MI (US)

(*) Notice: Subject to any disclaimer, the term of this patent is extended or adjusted under 35 U.S.C. 154(b) by 203 days.

(21) Appl. No.: 15/176,672

(22) Filed: Jun. 8, 2016

(65) Prior Publication Data
US 2016/0368034 A1 Dec. 22, 2016

Related U.S. Application Data

(60) Provisional application No. 62/180,539, filed on Jun. 16, 2015.

(51) Int. Cl.
| | |
|---|---|
| *B21C 37/15* | (2006.01) |
| *B23K 37/00* | (2006.01) |
| *B23K 13/02* | (2006.01) |
| *B21C 37/08* | (2006.01) |
| *B21C 37/083* | (2006.01) |
| *B21D 28/10* | (2006.01) |

(Continued)

(52) U.S. Cl.
CPC .......... *B23K 37/003* (2013.01); *B21C 37/083* (2013.01); *B21C 37/0803* (2013.01); *B21C 37/155* (2013.01); *B21D 28/10* (2013.01); *B23K 13/025* (2013.01); *B23K 26/262* (2015.10); *B23K 26/32* (2013.01); *B23K 31/027* (2013.01); *B23K 2201/006* (2013.01); *B23K 2201/16* (2013.01); *B23K 2203/04* (2013.01)

(58) Field of Classification Search
CPC ..... B21C 37/045; B21C 37/065; B21C 37/08; B21C 37/155; B21C 37/0803; B21D 28/10
See application file for complete search history.

(56) References Cited

U.S. PATENT DOCUMENTS

| | | | | |
|---|---|---|---|---|
| 6,286,201 | B1 * | 9/2001 | Prater | ................. B21C 37/0803 29/726 |
| 2005/0262982 | A1 * | 12/2005 | Machrowicz | ......... B21C 37/065 83/469 |

(Continued)

FOREIGN PATENT DOCUMENTS

| | | | | |
|---|---|---|---|---|
| EP | 0 447 251 A2 * | 3/1991 | ............. B21D 39/03 |

*Primary Examiner* — Christopher Besler
(74) *Attorney, Agent, or Firm* — Foley & Lardner LLP

(57) ABSTRACT

A method of manufacturing a tubular member for an automotive application that includes providing a flat workpiece of a material; forming at least one lance in the flat workpiece; roll-forming the flat workpiece into a tubular configuration; induction welding a seam of the tubular workpiece after the roll-forming; and trimming the tubular workpiece through the lance after welding the seam.

19 Claims, 10 Drawing Sheets

(51) Int. Cl.
*B23K 26/32* (2014.01)
*B23K 31/02* (2006.01)
*B23K 26/262* (2014.01)
*B23K 101/00* (2006.01)
*B23K 101/16* (2006.01)
*B23K 103/04* (2006.01)

(56) References Cited

U.S. PATENT DOCUMENTS

| | | | | |
|---|---|---|---|---|
| 2006/0201665 A1* | 9/2006 | Yu | ............................ | B21C 37/08 |
| | | | | 165/177 |
| 2012/0267138 A1* | 10/2012 | Fuenfer | .................... | B21C 37/08 |
| | | | | 173/200 |
| 2014/0117069 A1* | 5/2014 | Alber | ...................... | B23K 26/34 |
| | | | | 228/158 |

* cited by examiner

METHOD OF MANUFACTURING A WELDED TUBULAR SECTION USING IN-LINE NOTCHING AND TRIMMING INITIATED AFTER ROLL-FORMING AND WELDING

CROSS-REFERENCE TO RELATED PATENT APPLICATIONS

This application claims the benefit of and priority to U.S. Provisional Patent Application No. 62/180,539, filed on Jun. 16, 2015. The foregoing U.S. provisional application is hereby incorporated by reference in its entirety.

BACKGROUND

This application relates generally to the field of welded tubes for use in automobiles and other vehicles. More specifically, this application relates to welded tubes and a process for manufacturing the welded tubes on a single assembly line to eliminate the need for secondary operations.

Tubes used for automotive applications (e.g., bumpers, frame members and other suitable load carrying members) typically require unique trimming to add features (e.g., holes, slots, or other vehicle specific trim features) for installing the tube and or other components to the tube during assembly of the vehicle. Formed tubes that are welded following forming are trimmed off-line (i.e., not on the line performing the roll-forming) by way of one or more secondary operations (e.g., machining, die forming, laser cutting, water cutting, plasma cutting, etc.) due to the loss of formability and weld quality when the tubes have holes and other trimming features added prior to forming and welding. These secondary operations are costly and time consuming. Therefore, a new process that can eliminate even a single off-line secondary operation can reduce the cost and time to manufacture the tubes and provide a competitive advantage to the manufacturer.

SUMMARY

One embodiment of the application relates to a method/process of manufacturing a tubular member (e.g., tube, tubular section, etc.). The process includes providing a flat workpiece of a material. The process also includes forming at least one lance in the flat workpiece and roll-forming the flat workpiece into a tubular configuration. The process also includes induction welding a seam of the tubular workpiece, and trimming the tubular workpiece through the lance after welding.

The induction welding may be performed using a high frequency induction welder.

The process of forming the at least one lance in the flat workpiece may also include punching a locating hole in the workpiece. The process may further include engaging the locating hole in the workpiece with a locator in the tooling prior to trimming the tubular workpiece through the lance. The process of trimming the workpiece may be performed by a trimming blade that moves horizontally to engage and disengage the workpiece through the lance. The tooling may include a support member that is configured to support a backside of the workpiece during the trimming process. An end of the lance may be a through hole that extends through a wall of the workpiece.

The process may further include cutting the workpiece to a length via a cutting blade that moves vertically. The trimming and the cutting may be performed in the same station of the tooling.

Another embodiment relates to a method/process of manufacturing a tubular member, which may be for an automotive application. The method includes providing a flat workpiece of a material; forming at least one lance in the flat workpiece; roll-forming the flat workpiece into a tubular configuration; induction welding a seam of the tubular workpiece after the roll-forming; and trimming the tubular workpiece through the lance after welding the seam.

Another embodiment relates to a method/process of manufacturing a tubular member, which may be for an automotive application. The method includes providing a workpiece of a material. The method includes forming a lance in the workpiece and at least one through hole adjacent to an end of the lance. The method includes roll-forming the workpiece into a generally rectangular tubular configuration. The method also includes welding a seam of the tubular workpiece after the roll-forming; and trimming the tubular workpiece through the lance and the through hole after welding the seam.

Yet another embodiment relates to method/process of manufacturing a tubular member, which may be used for an automotive application. The method includes providing a workpiece of a material having a first side edge and a second side edge opposite the first side edge. The method includes forming a lance in the workpiece; and roll-forming the workpiece into a tubular configuration such that the first side edge faces the second side edge with a gap therebetween. The method includes welding a seam of the tubular workpiece after the roll-forming, where the seam is defined by the first side edge, the gap, and the second side edge. The method also includes removing a section of the tubular workpiece by trimming through the lance.

DETAILED DESCRIPTION

Referring generally to the FIGURES, disclosed herein are welded tubes and a process for manufacturing the welded tubes to include unique trim features on a single assembly line. The process involves forming a lance or shearing a portion of material partway through the thickness of the material in the flat workpiece prior to forming the workpiece into a tubular shape. The lance allows forming, welding, and trimming in-line (i.e., on the single assembly line) without a loss in formability or weld quality. Thus, the manufacturing process advantageously eliminates the need for secondary operations, which are costly and time consuming. For example, the lance eliminates the need to trim the tube in an off-line station post welding using an operation, such as machining, die forming, laser cutting, water cutting, plasma cutting, and other suitable secondary operations that might otherwise be employed to trim a welded tube off-line. The welded tubes formed by the process may be used for automotive applications, as well as for other applications, such as other vehicles. For example, the welded tubes may be used for bumpers, frame members, and other suitable load carrying members of vehicles.

Figure 1:
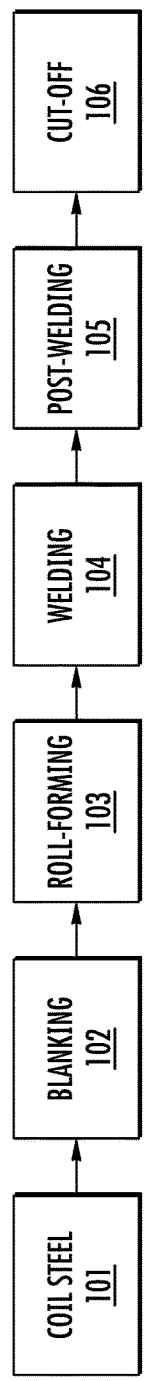
FIG. 1 is a schematic view of an exemplary method/process of manufacturing a welded tube.

FIG. 1 illustrates an exemplary embodiment of a method/process of manufacturing a welded tube. As shown, the method 100 includes six steps (e.g., steps 101-106), and each step is described in more detail below. However, it should be noted that the method 100 may include a fewer number or a greater number of steps, also described in more detail below.

Figure 2:
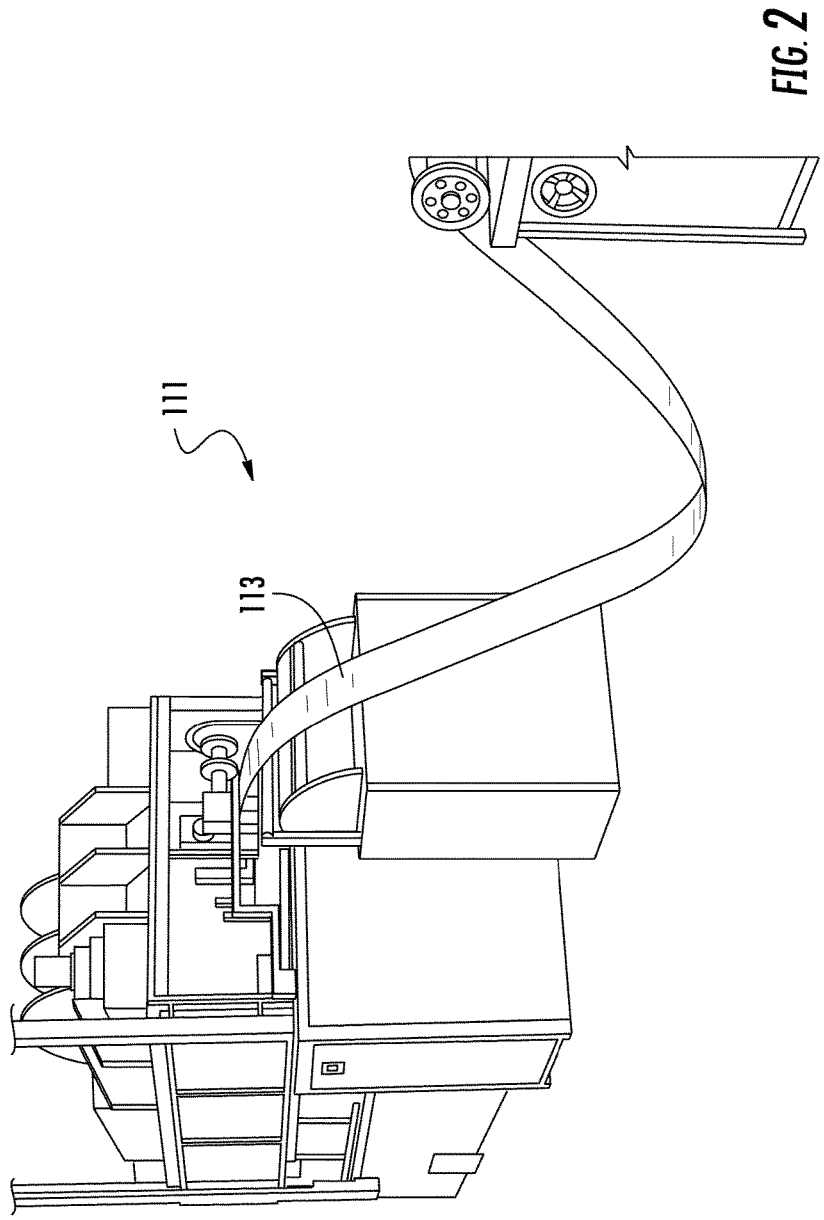
FIG. 2 is a perspective view of an exemplary embodiment of assembly equipment used in the manufacture of a welded tube.

The first step 101 involves providing a supply of a material (e.g., steel) that serves as a workpiece and will be processed to form the finished tube at the end of the process. As shown, the first step 101 includes providing a coil of steel to serve as the material for the workpiece. As shown in FIG. 2, the coil of steel is unrolled via in a first station 111 of an assembly equipment (e.g., assembly line) to form a relatively flat workpiece 113 that is moved to a downstream process for further forming. The thickness of the material depends on the application of the welded tube. As non-limiting examples, the thickness of the material may be about 4.5 mm to about 5.2 mm (e.g., the term "about" is meant to denote that a standard material tolerance is applicable). However, it is noted that thicker and thinner materials (compared to the range noted above) may be used with the processes of this application. It is noted that the supply of material may be provided in other forms, such as rectangular blanks of material. However, utilizing a coil of material advantageously reduces the labor needed to handle the material and allows for a continuous process, reducing time to build.

The second step 102 involves forming (e.g., blanking) a lance or shearing a portion of material partway through the thickness of the material in the flat workpiece via a subsequent (e.g., second) in-line station of the assembly equipment. Accordingly, as used herein, the term "lance" denotes shearing (e.g., moving, punching) a portion (e.g., section) of the workpiece partway through the thickness of the material, such that the sheared material is not detached completely from the workpiece. Thus, the lanced material is not sheared all the way through the thickness of the workpiece, which would form a detached slug or separate piece from the lance. According to an exemplary embodiment, at least a substantial portion of the lanced material remains attached to the adjacent portions of the workpiece. For example, the lanced portion includes at least one edge (e.g., side, surface, etc.) that remains directly connected to an adjacent non-lanced portion. The lanced portion may include an edge that is cut (e.g., disconnected) from the non-lanced portion following the lancing process. As discussed below in greater detail, the lanced portion advantageously allows for forming and welding of the workpiece without a loss in formability and weld quality during downstream in-line processes. When other processes were attempted, such as, for example, punching a through hole entirely in place of the lanced portion (i.e., removing the portion entirely as a slug rather than lancing it), the workpiece had a tendency to deform too much (e.g., collapse) during roll-forming and/or have weld quality issues with the seam weld.

Figure 3:
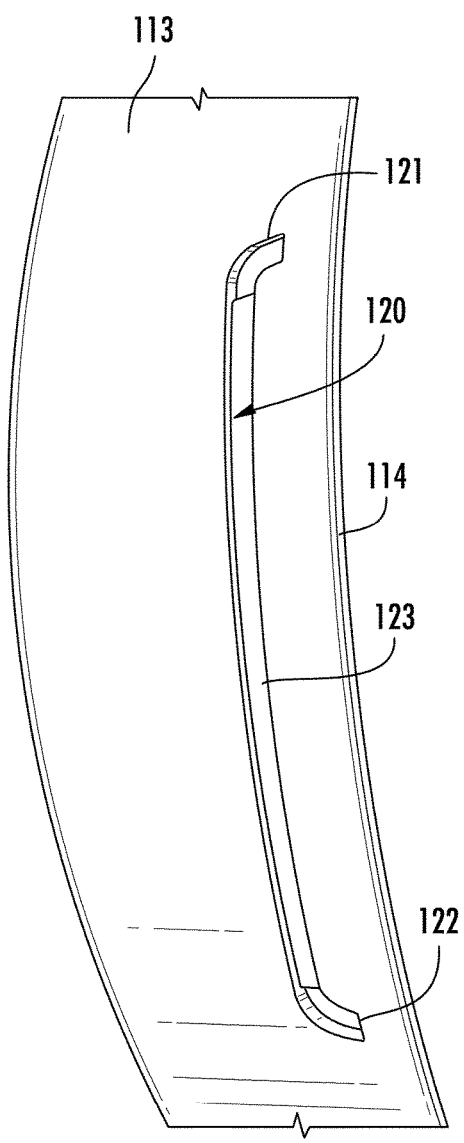
FIG. 3 is a perspective view of a portion of an exemplary embodiment of a workpiece having a lance provided therein prior to the formation of a welded tube from the workpiece.
Figure 4:
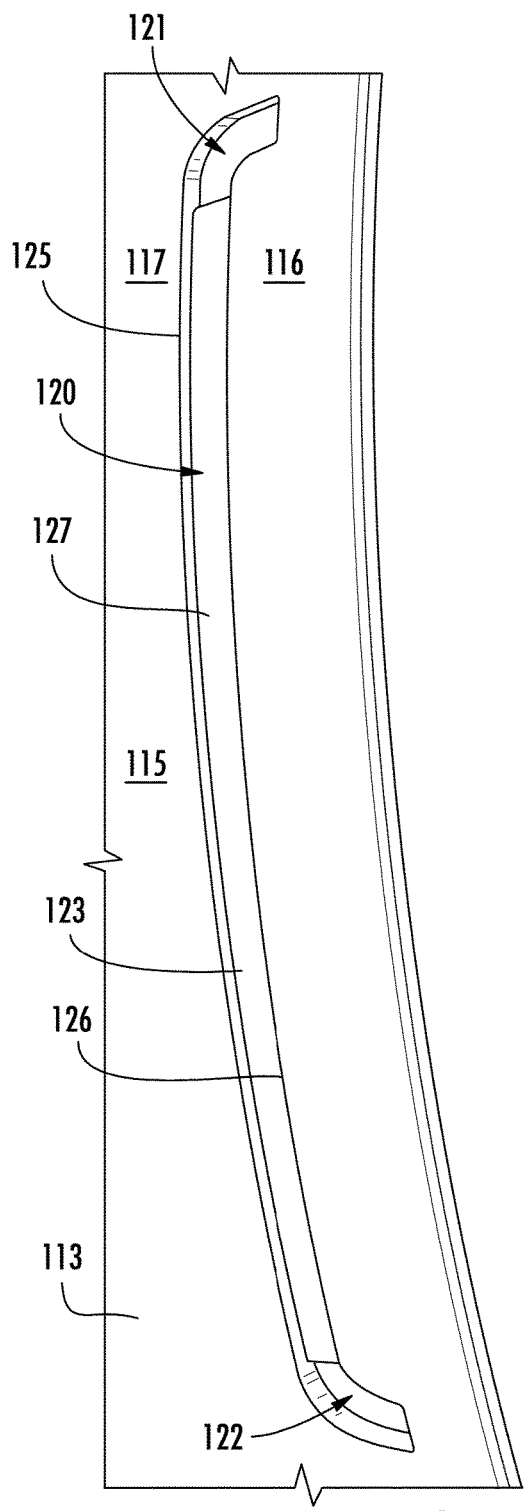
FIG. 4 is a detail view of the lance in a portion of the workpiece shown in FIG. 3.

FIGS. 3 and 4 illustrate an exemplary embodiment of a lance 120 formed in the workpiece 113. As shown, the lance 120 includes a first end 121, a second end 122, and an intermediate section 123 (e.g., intermediate portion) extending between the first and second ends 121, 122. The lance 120 may be formed offset from a side edge 114 of the workpiece 113 (see FIG. 3), such that that the lance 120 does not extend all the way to the side edge. According to an exemplary embodiment, at least a portion (e.g., the intermediate section 123) of the lance 120 is located in a region of the workpiece 113 that after further processing (e.g., roll-forming) may be a side of a tube (see FIG. 15 and the discussion thereof below). A portion of the periphery of the lance 120 is surrounded by adjacent material of the workpiece 113. According to an exemplary embodiment, the entire periphery of the lance 120 is surrounded by material (e.g., adjacent material of the workpiece 113).

The intermediate section 123 of the lance 120 is elongated in shape having a length that is substantially greater than a width of the intermediate section 123. According to an exemplary embodiment, a ratio of the length to the width of the intermediate section 123 is greater than 10:1. According to another exemplary embodiment, the ratio of the length to the width of the intermediate section 123 is greater than 20:1. It is noted that the ratio of length to width can be different than the examples disclosed, since the length/width can be tailored to the specific application.

The intermediate section 123 includes at least one edge that is directly connected to an adjacent non-lanced portion. For example, a first edge 125 may be directly connected to the adjacent non-lanced portion 115 of the workpiece 113. Also for example, a second edge 126 may be directly connected to the adjacent non-lanced portion 116 of the workpiece 113. According to yet another example, both the first and second edges 125, 126 are directly connected to the associated adjacent non-lanced portions 115, 116. The intermediate section 123 may also include at least one edge that is cut (e.g., disconnected) from the adjacent non-lanced portion. For example, one of the first and second edges 125, 126 may cut from the adjacent non-lanced portion and the other may remain directly connected to the adjacent non-lanced portion.

The intermediate section 123 of the lance 120 is offset by a depth (i.e., in the direction of the thickness of the workpiece) from the adjacent non-lanced portions 115, 116 of the workpiece 113. In other words, the mass of the intermediate section 123 is retained, but shifted (e.g., moved) in a direction of the thickness of the workpiece 113. As shown in FIG. 4, the intermediate section 123 has an exterior surface 127 (which may be located between the first and second edges 125, 126) that is recessed into the workpiece 113. Thus, the exterior surface 127 is provided at a different depth relative to an exterior surface 117 of the adjacent non-lanced portion 115 defining a channel (e.g., a groove) into the workpiece 113.

As shown in FIGS. 3 and 4, each end 121, 122 of the lance 120 has a generally J-shape (e.g., a J-shape, a backwards J-shape, etc.) and extends from a side of the intermediate section 123. However, each end may have other suitable shapes (e.g., rectangular, slotted, etc.). The first end 121 of the lance 120 may extend from a first side of the intermediate section 123, and the second end 122 of the lance 120 may extend from a second side of the intermediate section 123. Each end 121, 122 may have a length that is shorter than the length of the intermediate section 123. According to an exemplary embodiment, a ratio of the length of the intermediate section 123 to the length of an end 121, 122 is greater than 8:1. According to another exemplary embodiment, the ratio of the length of the intermediate section 123 to the length of an end 121, 122 is greater than 12:1. It is noted that the ratio of lengths can be different than the examples disclosed, since the lengths can be tailored to the specific application.

A portion of the lance 120 may be configured as a through-hole (i.e., a hole that extends through the entire thickness of the workpiece in that portion). For example, each end 121, 122 may be configured as a through-hole. Alternatively, a portion of each end 121, 122 may be configured as a through-hole. For these examples, the size (e.g., mass, volume, etc.) of the through hole of the lance 120 is relatively small compared to the overall mass of the lance 120, since at least a substantial amount of the mass of the lance 120 is moved and retained with the workpiece. The lance 120 may be configured not to have a through-hole at all, such as where the entire lance 120 is offset in depth compared to the adjacent non-lanced portions.

Figure 5:
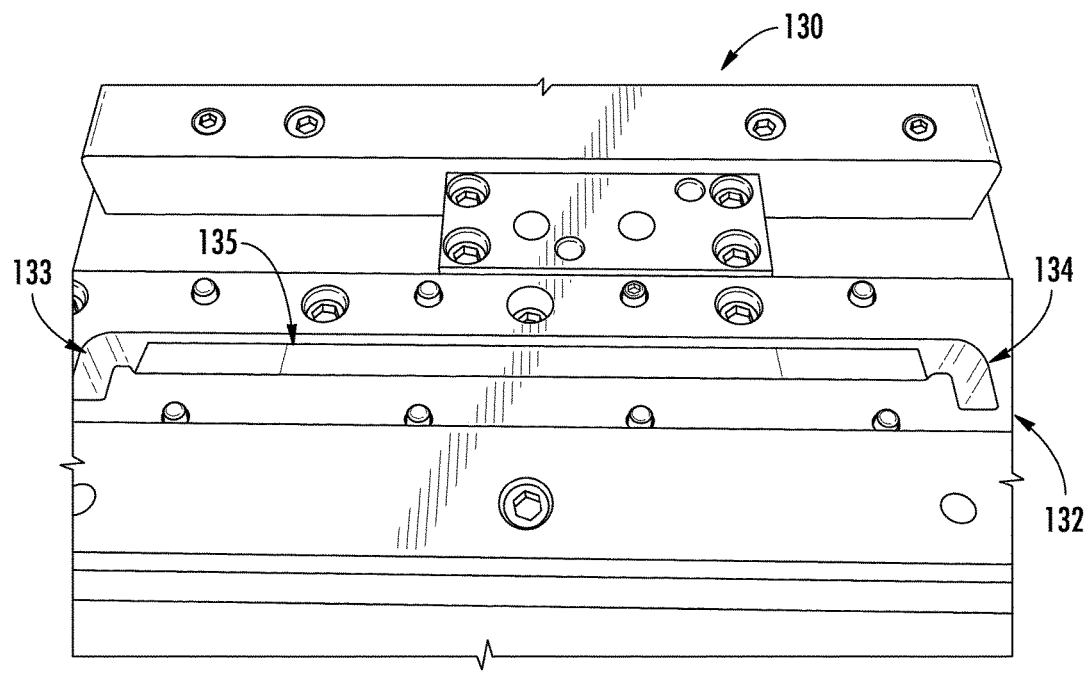
FIG. 5 is a perspective view of a first die-half for producing the lance shown in FIG. 4.
Figure 6:
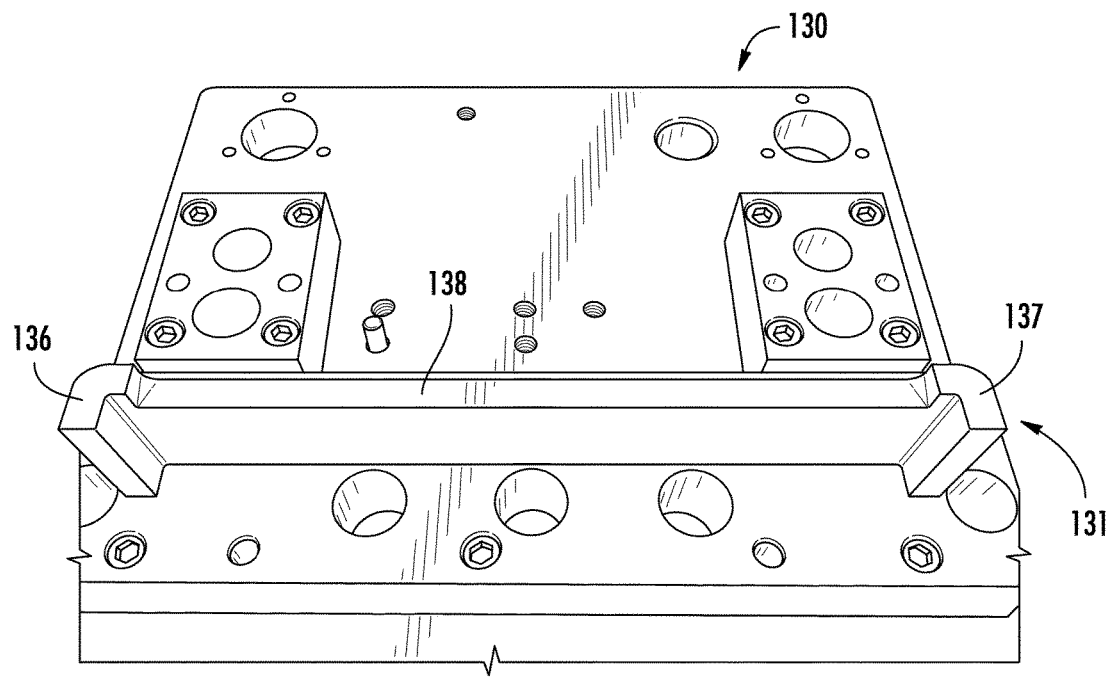
FIG. 6 is a perspective view of a second die-half for producing the lance shown in FIG. 4.

FIGS. 5 and 6 illustrate an exemplary embodiment of tooling 130 used in the manufacturing equipment (e.g., an in-line press) that is configured to form the lance 120 in the workpiece 113. As shown, the tooling 130 includes a punch 131 (FIG. 6) and a die 132 (FIG. 5) that are mating halves. At least one of the punch 131 and the die 132 is configured to move relative to the other between an open and a closed position to form the lance 120 in the workpiece 113 located between the two die halves. The punch 131 is configured having the shape of the lance in the workpiece. The die 132 has an opening that is shaped to receive the punch 131. As shown in FIG. 5, the depth of the ends 133, 134 of the opening in the die 132 are deeper than the depth of the intermediate section 135 of the opening, which is provided between the ends 133, 134. This difference is to account for the difference in depth between the ends 136, 137 of the punch 131 and the intermediate section 138 of the punch 131, as shown in FIG. 6, that forms, for example, the offset intermediate section 123 in the lance 120 and the through-holes 121,122. Thus, the ends 136, 137 of the punch 131 may extend farther than the intermediate section 138 of the punch 131, such that the ends 136, 137 make through (e.g., clearance) holes in the workpiece 113 and the intermediate section 138 does not form a through hole, but instead forms the channel by moving material.

Figure 7:
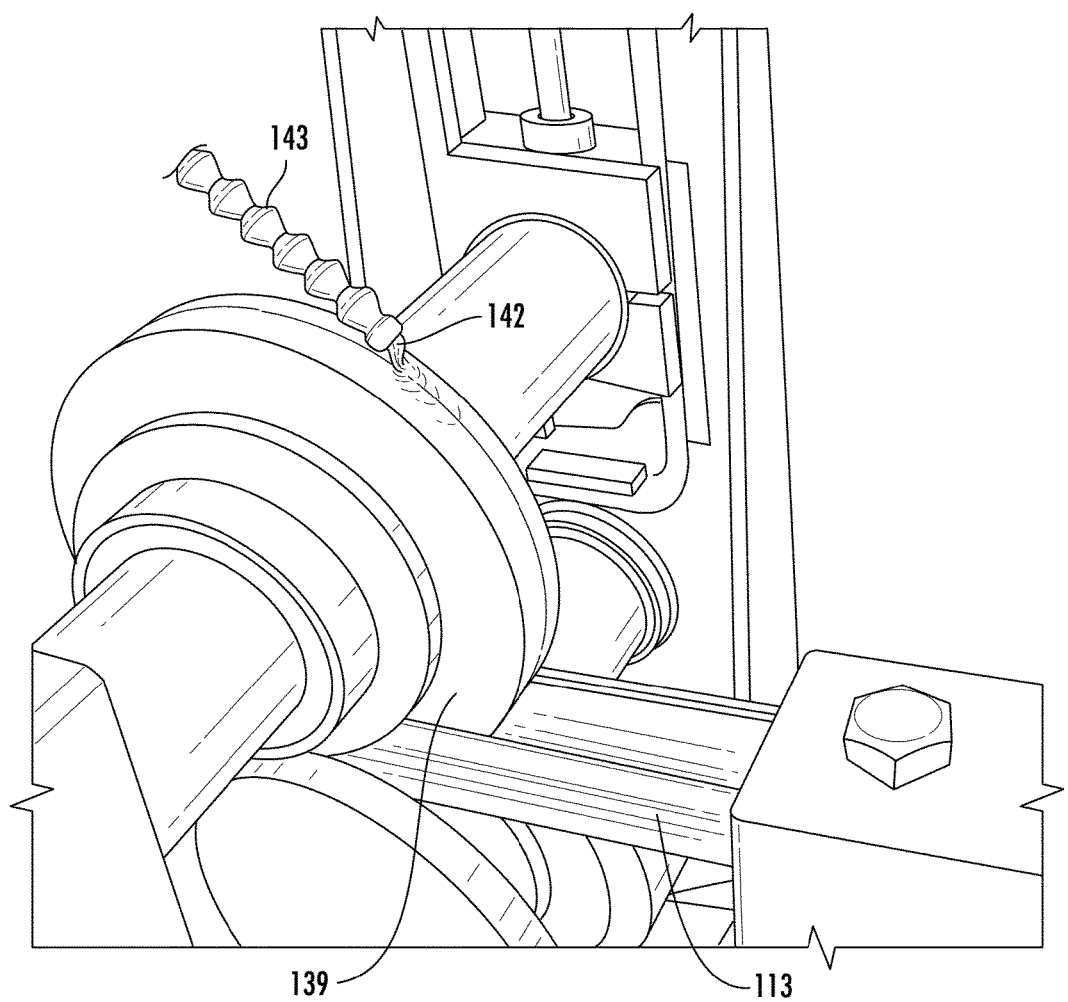
FIG. 7 is a perspective view of assembly equipment used to roll the workpiece prior to welding.
Figure 8:
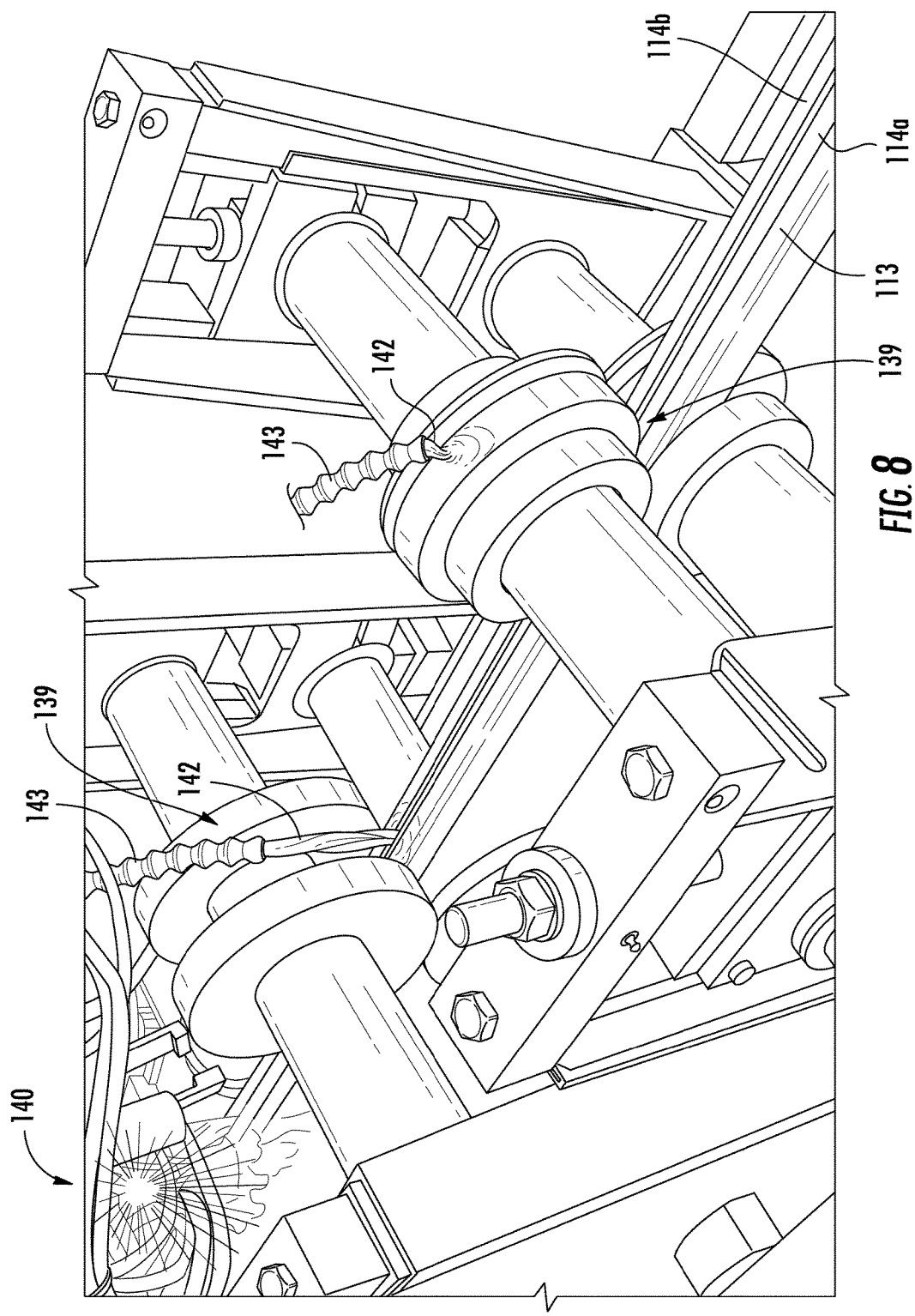
FIG. 8 is a perspective view of additional assembly equipment used to roll the workpiece prior to welding and used to weld a seam of the rolled tube.
Figure 9:
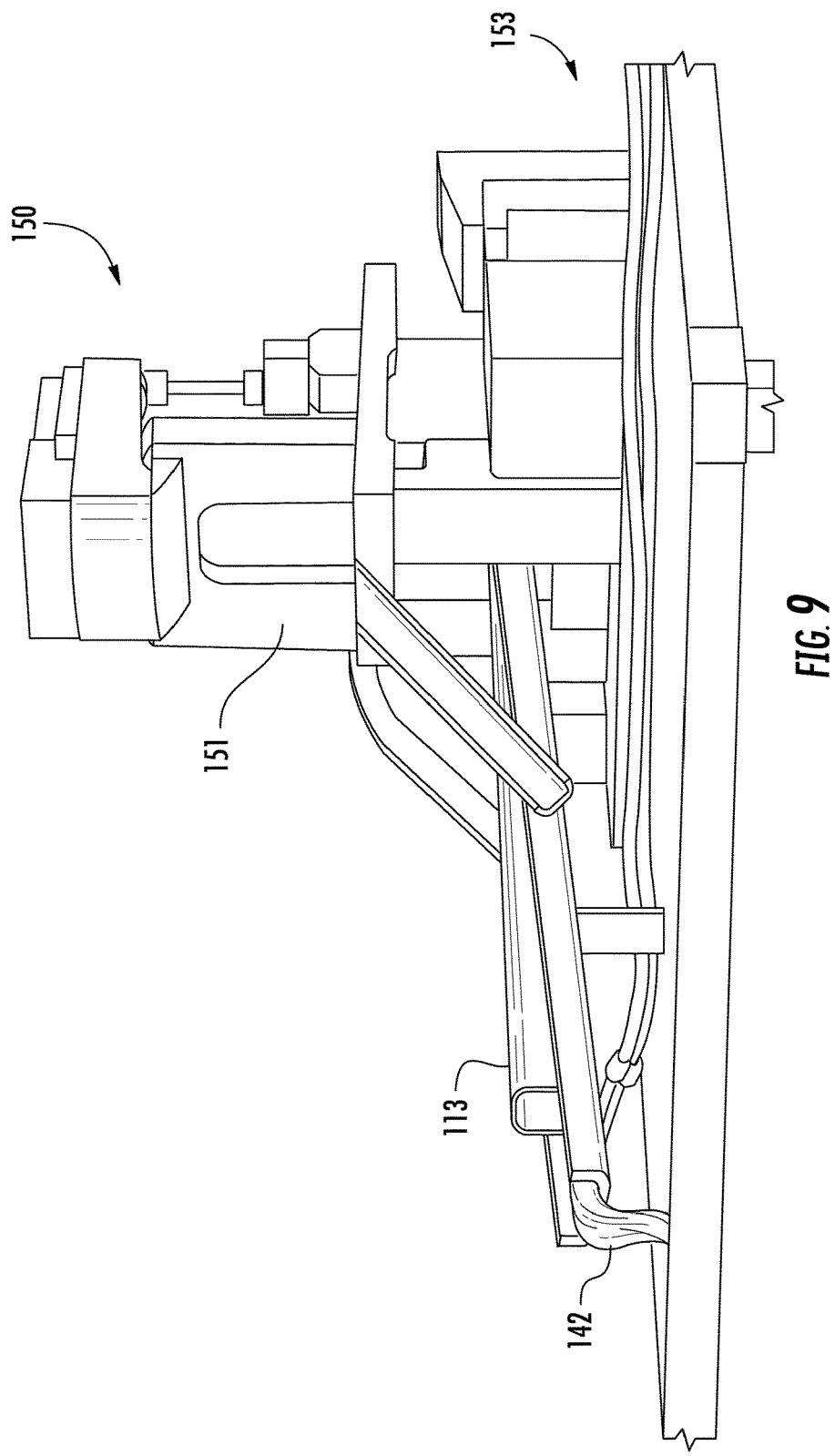
FIG. 9 is a perspective view of additional assembly equipment used to trim and cut a welded tube.

The third step 103 involves forming the tube shape from the flat workpiece 113 having the lance 120 by passing the flat workpiece through one or more roll-formers (e.g., rollers). As shown in FIGS. 7 and 8, the assembly equipment includes a plurality of roll-formers 139 arranged in series, with each successive roll-former 139 configured to deform the workpiece 113 progressively closer to the tube shape from the previous roll-former 139. As shown in FIG. 8, the roll-formers 139 are configured to converge the first side edge 114a and the second side edge 114b to form a V-angle between the side edges of the workpiece 113. Thus, the first and second side edges 114a, 114b are moved closer together as the workpiece 113 moves downstream through each successive roll-former 139. The first and second side edges 114a, 114b are brought into close proximity and may contact one another along a seam that is configured to be welded in the fourth step. Bringing the side edges 114a, 114b into contact may advantageously improve the weld quality.

According to an exemplary embodiment, the roll-forming reshapes the workpiece 113, such as from a generally flat workpiece 113 into a tubular workpiece (i.e., a workpiece that has a generally tubular shape). By way of examples, the tubular workpiece may have a generally rectangular shape (the term "generally rectangular" denotes that the shape could be, for example, a rectangular, square, a rectangular with rounded corners, a square with rounded corners or other shapes that resemble a rectangular shape), a generally circular shape, or other suitable tubular shape after reshaping.

The fourth step 104 involves welding the workpiece 113 along the seam formed between the side edges 114a, 114b. According to an exemplary embodiment, a high frequency induction welder (HFIW) is used to weld the seam of the workpiece 113. The HFIW provides high frequency energy that induces a magnetic field to weld the workpiece 113 through eddy currents produced by way of electromagnetic induction. The energy produced by the HFIW advantageously seeks out the contact point between the side edges (i.e., where edges defining the V-angle meet) and/or may direct the energy away from the lance 120. Moreover, the lance 120 allows the HFIW to maintain a relatively constant magnetic field due to the lance retaining the mass of material in the lanced section, which advantageously provides a more constant weld and increases the weld quality of the workpiece. That is, an HFIW can be sensitive to changes in mass in the workpiece, since such changes in mass affect the magnetic field and the eddy currents produced. By moving and retaining the material (rather than removing the material) when forming the lance 120, a good quality weld is formed in the lance 120, since the mass remains relatively constant from the non-lanced sections to the lanced area.

It has been found that removing the mass in the area of the lance 120, such as if a hole were stamped (e.g., punched through to form a hole or aperture) in the area instead, adversely affects the ability to weld the seam to the point that HFIW can no longer provide a usable weld (e.g., a weld that is both repeatable and provides the necessary strength and durability requirements). The loss of mass and material by a through hole in the area of the lance 120 (e.g., in place of the lance 120) leads to a loss of induction and a reduction of heat during welding, which adversely affects the quality of the weld.

It has also been found that the quality of the weld is not adversely affected if a relatively small portion of the lanced area includes a through-hole, such as the ends 121, 122 of the lance 120, since enough mass is retained in the lance 120 (e.g., through the intermediate section 123) to produce an adequate magnetic field. According to another exemplary embodiment, a laser welder may be used (in place of the HFIW) to weld the seam of the workpiece 113. The laser welder may, for example, apply a beam of high power energy to the outside of the seam to weld the seam by penetrating a depth into the workpiece.

As shown in FIG. 8, an HFIW 140 is located downstream of the last roll-former 139. As the workpiece 113 is moved downstream, the HFIW 140 continuously welds the seam to provide a continuously welded seam on the workpiece 113. In other words, the HFIW 140 welds the seam between the side edges 114*a*, 114*b* in a continuous manner, such that there is no gap in the weld bead.

After welding, the workpiece 113 may be passed through one or more optional post-welding processes before being cut and trimmed. It is noted that each of the optional post-welding processes would be provided in-line in the same assembly equipment (i.e., in the single assembly line between the welding and trimming stations), rather than as an off-line operation. The fifth step 105 involves these one or more optional in-line post-welding processes. Therefore, the fifth step 105 is optional altogether. One example of a post-welding process involves pushing together the sides of the tube until the weld is cooled. As an example, a squeeze box assembly may be provided in line following the welding station (e.g., the HFIW 140), and the squeeze box assembly may be configured to apply a compression force to the sides of the tube to maintain contact between the side edges 114*a*, 114*b* until the weld is cooled.

Another example of an in-line post-welding process involves quenching the weld. Thus, the fifth step may involve quenching the weld via a fluid. The fluid may be a gas, such as air, or a liquid, such as water, oil, coolant, or any suitable combination thereof. For example, a mixture of water and coolant in a ratio of about 97:3, respectively, may be used as the quenching fluid (where the term "about" means±2 for each constituent). It is noted that other suitable fluids may be used to quench the seam weld of the workpiece 113.

Another example of an in-line post-welding process involves scarfing the workpiece 113. The workpiece 113 may be passed through a scarfing tool located downstream of the welding station to remove excess weld on a top surface of the workpiece 113 (e.g., an outer surface of the weld seam). For example, the scarfing tool may be configured to remove a portion of the weld bead that protrudes outwardly from the seam.

Another example of an in-line post-welding process involves a resizing operation of the workpiece 113. The workpiece 113 may be passed through an operation to ensure the size of the outer periphery (e.g., profile) of the tube is within the specified tolerances, an operation to remove any twist (e.g., rotation of a section of the tube about a longitudinal axis of the tube relative to another section of the tube) from the workpiece 113, a combination of these operations, or any additional suitable operations.

Figure 10:
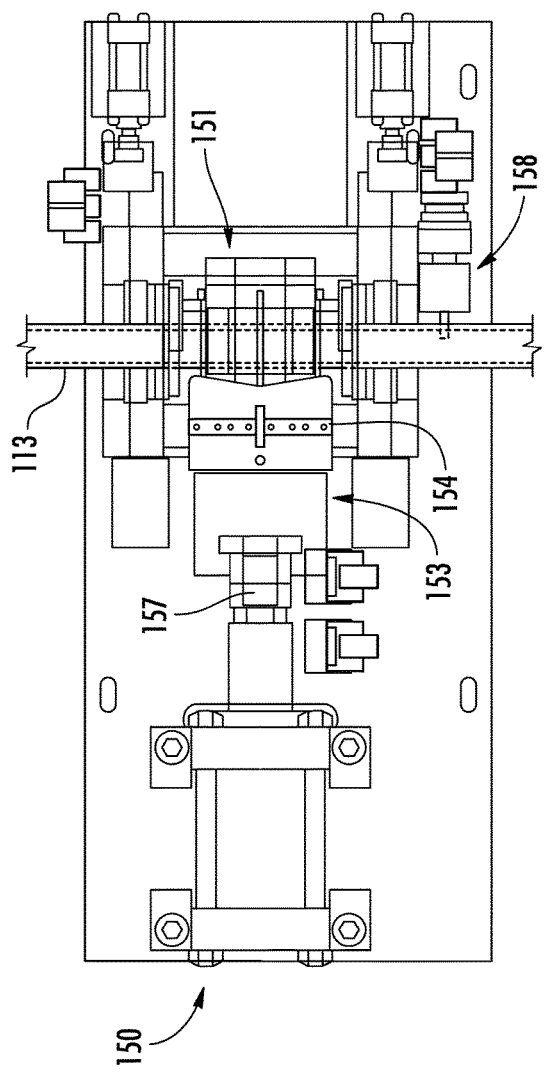
FIG. 10 is a top view of an engineering drawing of the assembly equipment shown in FIG. 9.
Figure 11:
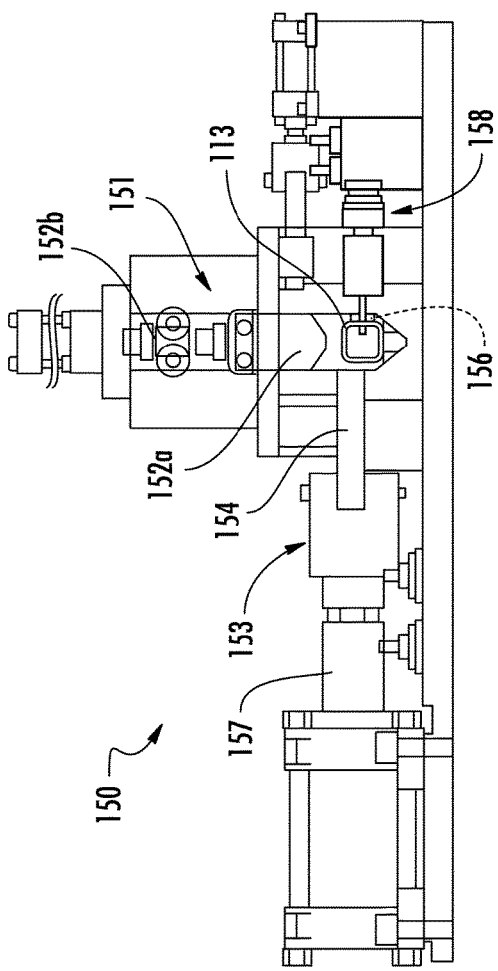
FIG. 11 is a front view of an engineering drawing of the assembly equipment shown in FIG. 9.

The sixth step 106 involves trimming and cutting the workpiece 113 to produce a final part (e.g., a finished tube). FIGS. 9-13 illustrate an exemplary embodiment of a tooling 150 configured to cut and/or trim the workpiece 113. The tooling 150 includes a cutting assembly 151 that is configured to cut the workpiece 113 to a specific length. According to an exemplary embodiment, the cutting assembly 151 includes a cutting blade 152 and a pressurized cylinder (e.g., hydraulic, pneumatic, etc.) that is configured to move the cutting blade 152 between a first position, in which the cutting blade 152 does not engage the workpiece 113, and a second position, in which the cutting blade 152 engages the workpiece 113 to cut the workpiece 113. As shown in FIGS. 10 and 11, the cylinder is vertically aligned, such that the cutting blade 152 is moved vertically (up and down) between the first and second positions. The cutting blade 152 may be moved to trim two ends, such as one end of each of two adjacent tubes, in a single cycle.

Figure 12:
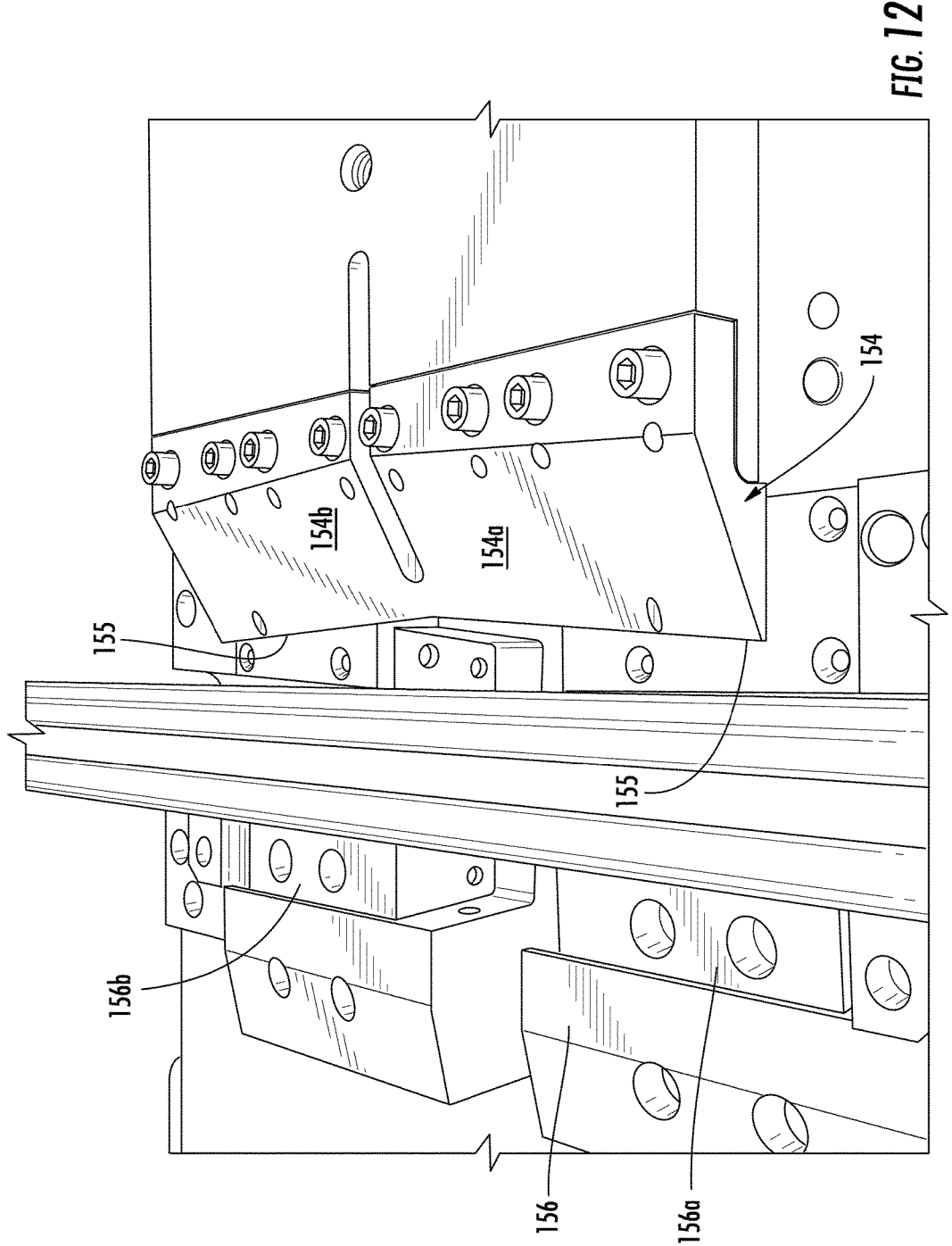
FIG. 12 is a perspective view of an exemplary embodiment of a welded tube prior to trimming and additional assembly equipment used to trim the welded tube shown in FIG. 9.
Figure 13:
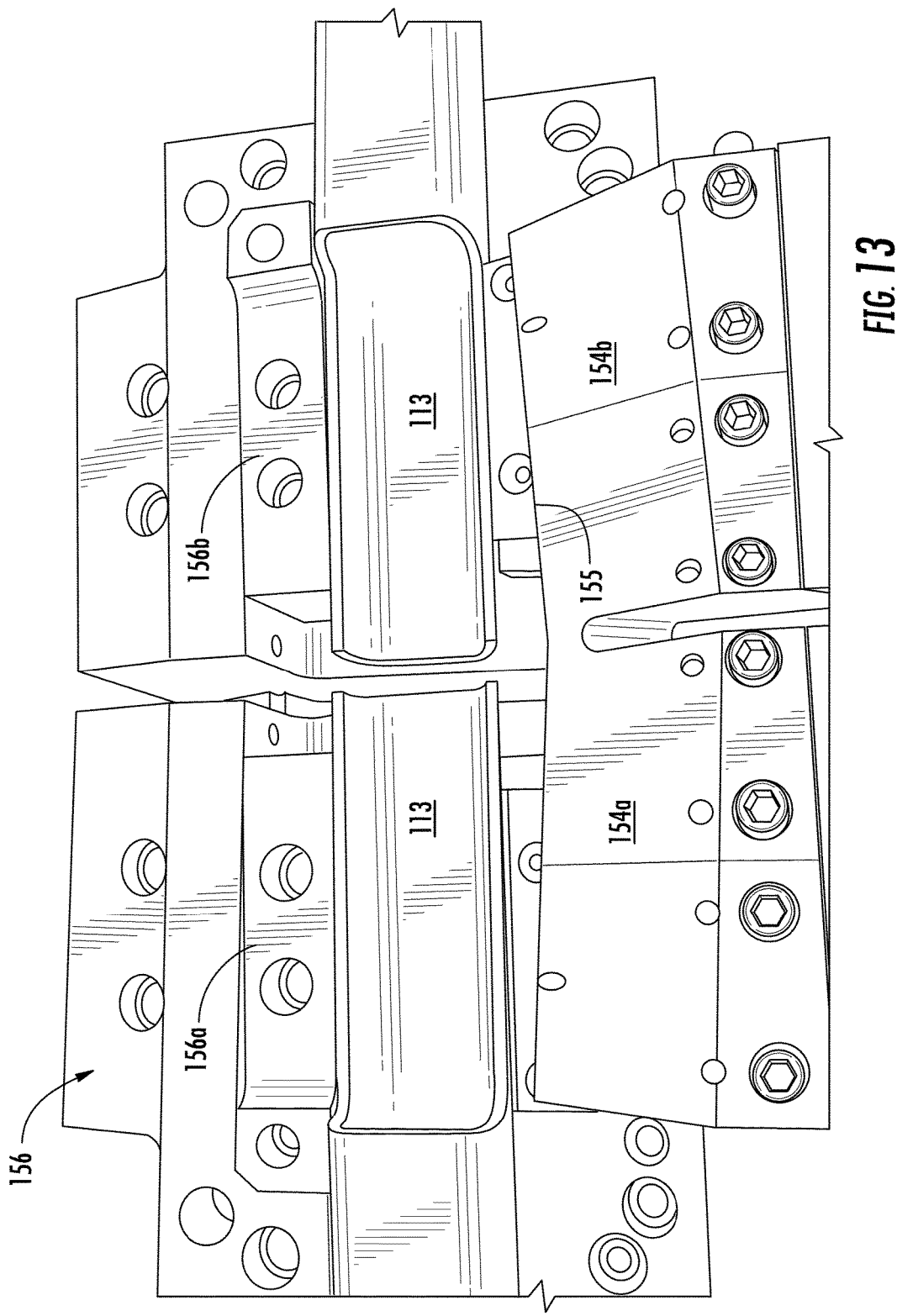
FIG. 13 is a top perspective view of an exemplary embodiment of a welded tube after trimming and cutting, along with the assembly equipment shown in FIG. 12 for trimming the tube.

The tooling 150 also includes a trimming assembly 153 that is configured to trim the workpiece 113 at the lance 120. As shown in FIGS. 12 and 13, the trimming assembly 153 includes a trimming blade 154 and a support member 156 that is configured to support (e.g., back-up) the workpiece 113 when the trimming blade 154 trims the workpiece 113. As shown in FIGS. 10 and 11, the trimming assembly 153 includes a pressurized cylinder (e.g., hydraulic, pneumatic, etc.) that is configured to move the trimming blade 154 between a first position, in which the trimming blade 154 does not engage the workpiece 113, and a second position, in which the trimming blade 154 engages the workpiece 113 to trim the workpiece 113. As shown, the cylinder is horizontally aligned, such that the trimming blade 154 is moved horizontally (side to side) between the first and second positions. The trimming blade 154 may be moved to trim one end of each of two adjacent tubes in each cycle.

As shown in FIGS. 12 and 13, the trimming blade 154 includes a first (e.g., left-hand) side 154*a* and a second (e.g., right-hand) side 154*b*, where the second side 154*b* is configured to trim a leading end of a first tube and the first side 154*a* is configured to trim a trailing end of a second tube. Thus, the trimming blade 154 is configured to trim one end of two different tubes during each cycle. For purposes of this application, the terms "leading" (e.g., leading end) and "trailing" (e.g., trailing end) are relative to the direction of movement of the workpiece. Thus, the leading end is the end that leads (e.g., is forward of) the trailing end while the workpiece moves along the assembly equipment, and the trailing end is the end that follows (e.g., is rearward of) the leading end as the workpiece moves through the assembly equipment.

Each side 154*a*, 154*b* of the trimming blade 154 is configured having a trimming edge or trimming surface, shown in FIGS. 12 and 13 as the surface 155, that is configured to first contact the workpiece 113 and initiate the trimming process. Each side 154*a*, 154*b* of the trimming blade 154 may be configured to increase in size (e.g., cross-section, height, etc.) moving from the trimming edge/surface away from the workpiece. For example, each side 154*a*, 154*b* may be generally wedge shaped. The sides 154*a*, 154*b* of the trimming blade 154 may be aligned at an angle relative to one another. For example, each surface 155 of each side 154*a*, 154*b* may be aligned at an angle relative to the workpiece 113 (and/or relative to the other surface 155). As shown, the adjacent surfaces 155 of the sides 154*a*, 154*b* form a flattened V-shape when viewed from above. This configuration may advantageously reduce the force required by the trimming assembly 153 to trim the workpiece 113, since a relatively small portion of the lance 120 is being trimmed at any given time, since the trimming blade 154 moves in a continuously progressive manner. Stated differently, only a relatively small portion of the surface 155 contacts the workpiece 113 at any given time, so the force to trim the workpiece is reduced. Thus, the trimming blade 154 may be configured to be parallel to the workpiece 113, but the entire surface 155 would come into contact with the workpiece at the same time, which would increase the force required to trim the workpiece (and also increase the size and power of the cylinder required to move the trimming blade 154).

The support member 156 is configured to support a backside (e.g., the side opposite the side that is trimmed by the trimming blade 154) of the workpiece 113 when the trimming blade 154 trims the workpiece 113. Thus, the support member 156 limits movement of the workpiece 113 in the direction of cutting (i.e., toward the support member 156) to allow the trimming blade 154 to trim the workpiece 113. As shown in FIGS. 12 and 13, the support member 156 includes a first part 156a that is configured to support the backside of the portion of the tube that is being trimmed by the first side 154a of the trimming blade 154, and also includes a second part 156b that is configured to support the backside of the portion of the tube that is being trimmed by the second side 154b of the trimming blade 154.

The lance 120 advantageously allows the workpiece 113 to be trimmed in-line (i.e., in the same assembly line/equipment and not via an off-line or secondary process) without distorting or bending the shape of the tubular workpiece 113, such as the ends of the workpiece 113 that are being trimmed. Since, the workpiece 113 moves progressively down the line (of the assembly equipment), it would be impractical to support the inside surface of the side of the tube that has the lance (e.g., the entry side of the horizontal trimming blade 154). Thus, the lance 120 is able to eliminate the need of a support on the inside surface of the side of the workpiece that has the lance. The lance 120 also eliminates the need for any secondary (i.e., off-line) processes to trim the tube.

The tooling 150 may include a locator 158 that engages the workpiece 113 to provide for repeatable and accurate trimming of the workpiece. As shown in FIGS. 10 and 11, the locator 158 is configured to move into and out of engagement with an opening (e.g., hole, aperture, etc.) in the workpiece 113 to ensure proper orientation (e.g., alignment) of the workpiece relative to the tooling 150. Thus, the locator 158 serves as a positive mechanical locating feature that engages an opening in each tube to ensure that the correct portions of the workpiece 113 are trimmed and cut. To further enhance the accuracy of the cutting and trimming, the opening (in the workpiece) that the locator 158 engages is punched (in the workpiece) in the same operation as the lance 120 to ensure the relative spacing between the opening and the lance 120 is repeatable and accurate.

Figure 14:
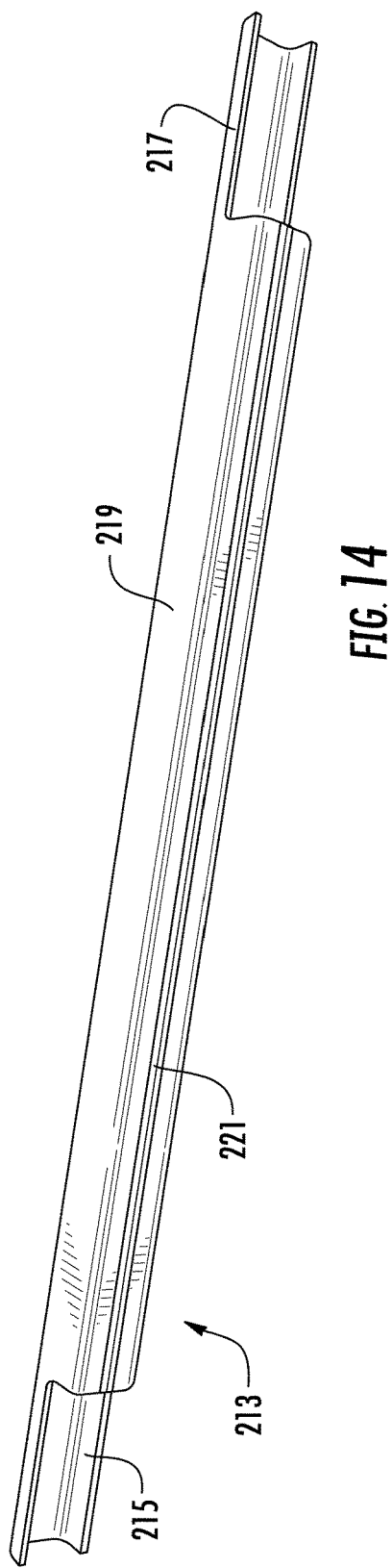
FIG. 14 is a perspective view of an exemplary embodiment of a finished tube produced by an exemplary method of this application, such as the method shown in FIG. 1.
Figure 15:
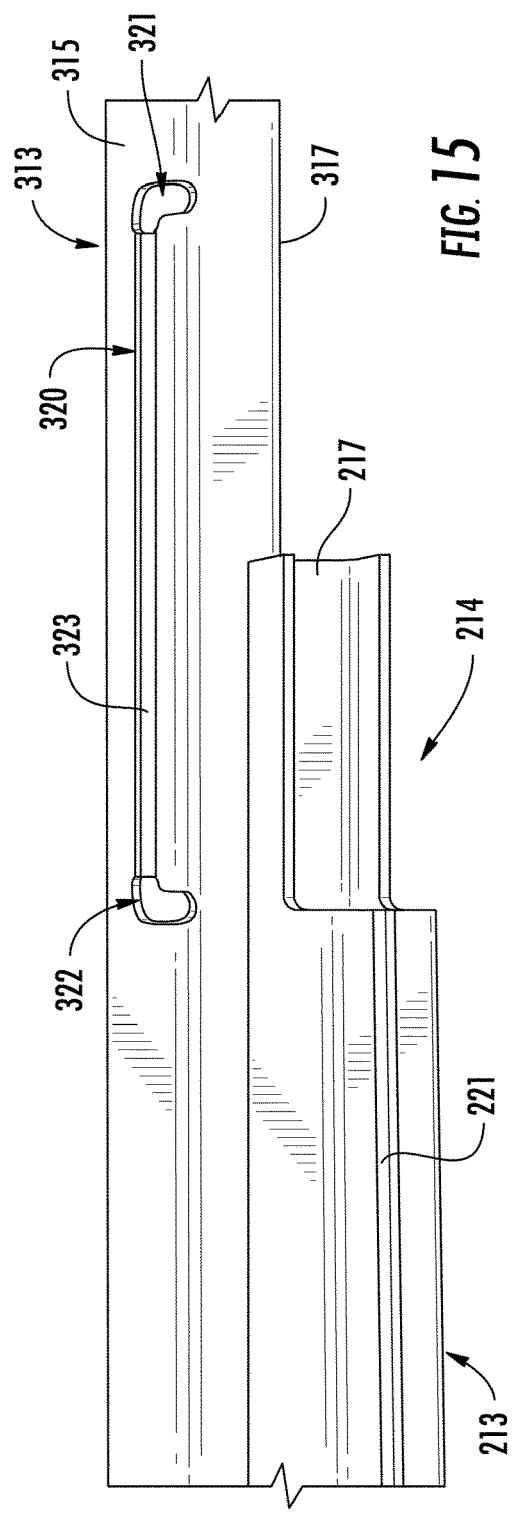
FIG. 15 is a perspective view of a portion of the tube shown in FIG. 14 and a portion of a welded tube produced by the same method, except prior to trimming and cutting.

FIGS. 14 and 15 illustrate an exemplary embodiment of a welded tube 213 (e.g., workpiece) produced by the exemplary method provided above. The tube 213 is hollow and has a generally rectangular or square shape. However, according to other examples, the tube can have other shapes. As shown in FIG. 14, the tube 213 includes a first end 215, a second end 217 opposite the first end 215, and an intermediate section 219 extending between the two ends 215, 217. A weld seam 221 extends the length of the tube (pre-trimming of the ends), but end portions of the weld seam 221 are trimmed off with the ends 215, 217.

FIG. 15 illustrates a portion of the welded tube 213 of FIG. 14 and a portion of a welded tube 313 produced by the same method, except prior to trimming of the lance 320 and cutting to length. The lance 320 of the tube 313 includes a first end 321, a second end 322, and an intermediate section 323 extending between the ends 321, 322. As shown, the lance 320 is configured the same as the lance 120 of the workpiece 113. However, the lance 320 may be configured similar to or different than the lance 120, according to other examples. As shown, the lance 320 is disposed in a wall 315 (e.g., side wall) that is adjacent to a wall 317 that includes the weld seam 221. Also shown in FIG. 15, following the trimming of each end of the tube through the lance 320, each end of the tube (e.g., ends 215, 217) includes a notch 214 that removes a portion of the wall having the weld seam 221, as well as a portion of each adjacent wall. Thus, each end of the tube 213 has a generally C-shaped or U-shape cross-section rather than a closed tubular cross-section like the intermediate section 219 of the tube 213.

The process for manufacturing the welded tubes, as disclosed herein, advantageously produces a welded tube that includes unique trim features on a single assembly line (i.e., without the need for any secondary or off-line operations). By shearing a portion of material partway through the thickness of the material in the flat workpiece prior to forming the workpiece, the lance or sheared portion allows for forming the flat workpiece into a shape, such as a tube, without formability issues and allows for welding of a seam (after forming) by way of induction welding (e.g., HFIW) without weld quality issues. The process reduces the cost and the time required to manufacture the tubes by eliminating secondary operations that would otherwise be employed to finish the tube.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the welded tubes and processes for manufacturing the tubes, as shown in the exemplary embodiments herein, are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., lance, notch, weld, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A method of manufacturing a tubular member for an automotive application, the method comprising:
   providing a workpiece of a material;
   forming a lance in the workpiece and at least one through hole adjacent to an end of the lance;
   roll-forming the workpiece into a generally rectangular tubular configuration;
   welding a seam of the tubular workpiece after the roll-forming; and
   trimming the tubular workpiece through the lance and the through hole after welding the seam;
   wherein a first through hole of the at least one through hole is directly connected to the end of the lance.

2. The method of claim 1, wherein a thickness of the material is between 4.5 and 5.2 millimeters.

3. The method of claim 1, further comprising quenching the welded seam using a mixture of water coolant in a ratio of 97:3.

4. The method of claim 3, wherein welding the seam of the tubular workpiece after the roll-forming comprises welding the seam using induction welding.

5. The method of claim 1, further comprising cutting the tubular workpiece to a predetermined length using a cutting blade that moves in an up and down direction, wherein the trimming of the tubular workpiece is performed using a trimming blade that moves in a side to side direction.

6. The method of claim 5, wherein the trimming and the cutting are performed in a common station of a tooling.

7. The method of claim 1, wherein the lance has an elongated shape having a ratio of a length to a width that is greater than 10:1.

8. The method of claim 7, wherein the ratio of the length to the width is greater than 20:1.

9. The method of claim 1, wherein the lance comprises:
   a first side directly connected to a first adjacent non-lanced portion of the workpiece; and
   a second side directly connected to a second adjacent non-lanced portion of the workpiece.

10. The method of claim 9, wherein the first and second sides are on opposite sides of the lance.

11. The method of claim 10, wherein the lance comprises a first end and a second end, wherein the first end is adjacent to the first through hole of the at least one through hole, and the second end is adjacent to a second through hole of the at least one through hole.

12. The method of claim 11, wherein each of the first and second sides are located along a length of the lance, and each of the first and second ends are located along a width of the lance.

13. The method of claim 12, wherein the lance has an elongated shape having a ratio of the length to the width that is greater than 10:1.

14. The method of claim 10, wherein each of the first and second through holes has a J-shape.

15. The method of claim 1, wherein forming the lance in the workpiece also includes punching a locating hole in the workpiece, the locating hole being engaged by a locator in a tooling prior to trimming the tubular workpiece through the lance.

16. The method of claim 15, further comprising providing a support member of the tooling for supporting a backside of the workpiece during the trimming process, wherein the trimming blade moves in an orthogonal direction relative to a longitudinal direction of the workpiece to engage and disengage the lance of the tubular workpiece.

17. The method of claim 1, wherein the lance is directly connected to adjacent material of the workpiece that is non-lanced around an entire periphery of the lance except for the at least one through hole.

18. The method of claim 1, wherein roll-forming the workpiece into a generally rectangular tubular configuration comprises roll-forming the workpiece such that a first side edge faces a second side edge with a gap therebetween, and wherein the seam is defined by the first side edge, the gap, and the second side edge.

19. The method of claim 18, wherein trimming the tubular workpiece comprises cutting the tubular workpiece through the lance and the at least one through hole to divide the tubular workpiece into two tubular members having symmetrically opposite configurations, such that the each tubular member has part of the removed section at an end of the tubular member.

* * * * *